United States Patent
Wawrzynski et al.

(10) Patent No.: US 6,987,973 B2
(45) Date of Patent: Jan. 17, 2006

(54) METHOD FOR DETERMINATION OF THE MINIMUM DISTANCE BETWEEN FREQUENCY CHANNELS WITHIN PRE-SELECTED BASE STATION CELLS

(75) Inventors: Pawel Wawrzynski, Raszyn (PL); Grzegorz Lehmann, Kargowa (PL)

(73) Assignee: Polska Telefonia Cyfrowa Sp. Zoo., Warsaw (PL)

(*) Notice: Subject to any disclaimer, the term of this patent is extended or adjusted under 35 U.S.C. 154(b) by 138 days.

(21) Appl. No.: 10/478,972

(22) PCT Filed: Dec. 4, 2001

(86) PCT No.: PCT/PL01/00097

§ 371 (c)(1),
(2), (4) Date: Nov. 24, 2003

(87) PCT Pub. No.: WO02/096141

PCT Pub. Date: Nov. 28, 2002

(65) Prior Publication Data

US 2004/0157615 A1  Aug. 12, 2004

(30) Foreign Application Priority Data

May 23, 2001  (PL) ................................ 347682

(51) Int. Cl.
H04Q 7/20 (2006.01)

(52) U.S. Cl. ............... 455/450; 455/134; 455/67.3; 455/447; 455/446; 455/296

(58) Field of Classification Search ............... 455/450, 455/446, 447, 296, 134, 67.3
See application file for complete search history.

(56) References Cited

U.S. PATENT DOCUMENTS

| | | | | |
|---|---|---|---|---|
| 5,483,667 A | * | 1/1996 | Faruque | 455/447 |
| 5,561,839 A | * | 10/1996 | Osterberg et al. | 455/446 |
| 6,088,341 A | * | 7/2000 | Hinedi et al. | 370/319 |
| 6,154,654 A | * | 11/2000 | Mao | 455/446 |
| 6,487,414 B1 | * | 11/2002 | Tanay et al. | 455/450 |

* cited by examiner

Primary Examiner—Rafael Perez-Gutierrez
Assistant Examiner—Kwasi Karikari
(74) Attorney, Agent, or Firm—Horst M. Kasper

(57) ABSTRACT

The method consists in the use of the average network traffic data and a series of measurements taken within a part of a network, along with the recording of the signals, received from all base stations within reach of a given point. The measurement area is divided into polygonal sections, relating to specific P measurements and the total area of such section represents the weight of a given measurement. Subsequently, based on the most powerful signal criterion, individual P measurements are assigned to specific network cells. Further on, the based on the differences between signal power value calculated, measurement weights and the assumed distances between channels, values of certain formulae are calculated, which then provide the basis for determination of the minimum distances between channels.

1 Claim, 2 Drawing Sheets

METHOD FOR DETERMINATION OF THE MINIMUM DISTANCE BETWEEN FREQUENCY CHANNELS WITHIN PRE-SELECTED BASE STATION CELLS

TECHNICAL FIELD

The invention concerns a method for determination of the minimum distance between frequency channels in the pre-selected cells of base stations within a mobile telephony network, i.e. located in the urban area, in order to avoid signal interference.

BACKGROUND ART

In the past, assignment of channels to cells of base stations in the fashion, which would ensure avoidance of interference impairing call quality required repeated interference measurements and expertise of network designers, which would allow for a correct interpretation of measurement results. In order to ensure avoidance of the interference, the PEGASOS software has been deployed, provided for determination of the plan of frequencies. The software supports assignment of channels to cells of base stations and the graphic presentation of the theoretical network range, the so-called network coverage, using mathematical models of propagation, digital terrain maps with the network structure superimposed thereon and the list of frequency channels, allocated to a given operator. In practise the theoretical computations do not always assure sufficient accuracy. Therefore, the authors of PEGASOS have released an additional source of corrective data, referred to as the Interference Optimisation Tool (IOT), including a real-life interference relation matrix. The IOT table is in fact a list of the minimum distances between frequency channels within pre-selected cells of base stations and those channels within another cell, which will interfere with them, should the distances between them be smaller than those provided in the table. In other words, the IOT table includes a list of channel restrictions, to be applied in order to avoid interference degrading call quality. Additionally, IOT channels restriction considered different quality requirements for specific GSM logical channels (BCCH, TCH) implemented on specific frequency channels. A network planner enters types of forbidden interference relations—defined in the PEGASOS specifications—into the IOT table using a dedicated interactive application and based on its experience in interpretation of the on-the-ground measurements. To date, we lacked a method for determination of the minimum distances between channels independent from a subjective assessment of a planner, i.e., which would be a reliable basis for a reliable IOT table.

DISCLOSURE OF INVENTION

In accordance to the invention at the beginning at least two specific distances between channels ($Z_i$) are defined, to which specific signal power delta value is then assigned. Subsequently, a series of measurements $P_i$ are taken along the pre-defined measurement routes located within the area of cells of the pre-selected base stations. The $P_i$ measurement consists in the recording of reference numbers of the channels carrying the signals received, power of the signal within each channel, base station IDs and the geographic co-ordinates of the point where the measurement is taken. Moreover, for each cell the average peak traffic and the average total daily traffic are registered. For each pair of cells the average peak and the average total daily number of calls handed over from cell 1 to cell 2 and vice versa are recorded. Further on, for each $P_i$ measurement a sector is determined, where a distance between any point therein and the point of the $P_i$ measurement is shorter than a distance between such point and the point of other $P_i$ measurement. In the next step, a $W_i$ weight is determined of each $P_i$ measurement, equal to the area of each such sector and each $P_i$ measurement is assigned to a particular $S_i$ serving cell, selecting that with the most powerful signal as received in the given location. Subsequently, for each $P_i(S)$ measurement assigned to a selected S serving cell a difference is calculated between the signal power from the S cell and the power of each of the other signals received from other cells, referred to as $K_i(S)$. Thereon, for each of the $Z_i$ distances defined the $SUM_{SK}(Zi)$ sums of $W_i(S)$ weights are computed for all types of those $P_i(S)$ measurements, for which the calculated power difference is smaller than the signal power delta assigned to a specific $Z_i$ distance. Then, for each of the $K_i(S)$ cells there is calculated the $q_{SK}(Z_i)$ ratio of interference with a pre-selected $S_i$ serving cell, equal to the quotient of $SUM_{SK}(Z_i)$ and the total $W_i(S)$ weights for all $P_i(S)$ measurements applicable to the same $S_i$ serving cell. Subsequently, for each $K_i(S)$ cell analysed, the value is computed of the following formula:

$$(\alpha^* T_T(S) + \beta T_B(S) + \delta^* H_T(S) + \gamma^* H_B(S))^* q_{SK}(Z_i)$$

where $\alpha$, $\beta$, $\delta$ i $\gamma$ represent non-negative ratios selected by the system operator, $T_T(S)$ represents the average daily traffic in the $S_i$ cell, $T_B(S)$ represents the average peak traffic in the serving cell, $H_T(S)$ represents the daily average number of calls handed over between the S and K(S) cells, and $H_B(S)$ stands for the peak average number of such calls. As a final step, for each $K_i(S)$ cell a minimum distance assigned between a channel in such $K_i(S)$ and a channel in the pre-selected S serving cell, equal to the largest $Z_i$ distance for which the value of the above formula is lower than, or equals one.

This method uses measurement data that may be easily obtained and the traffic data already available within the system, as operators gather them for various other purposes. Accuracy of the resultant interference value, arrived at when this procedure is followed, in fact automatic and objective, is comparable to that obtained as result of application of the traditional method. It also enables a much more comprehensive optimisation of the network, since planners are no longer required to engage into laborious analysis of measurement data.

BRIEF DESCRIPTION OF DRAWINGS

Practical application of the invention has been depicted by the drawings, where.

MODE FOR CARRYING OUT THE INVENTION

Figure 1:
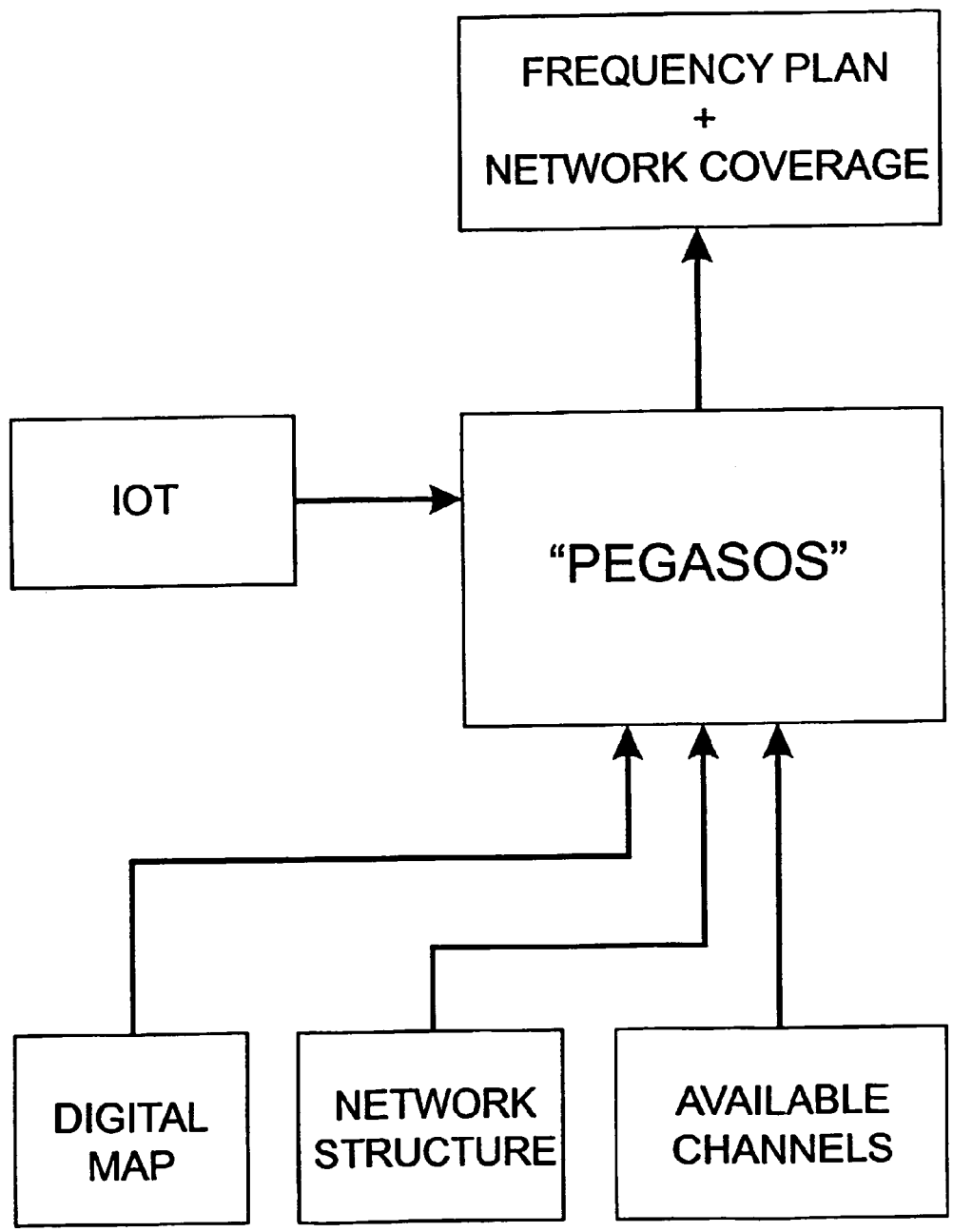
FIG. 1 presents the operating principle of PEGASOS software.

Below, we shall describe the use of this invention for the set-up of IOT table, used by the PEGASOS application as presented in FIG. 1. In line with the licence, base stations of a mobile operator within the given area may transmit their signal using frequency channels of a pre-set reference numbers. Specifications of the planning software provide for a certain number of interference relations, of which we shall use the BTA, TTC and BTC relation for the purpose of this presentation.

Of these relations, three minimum distances between channels derive, which we shall refer to as $Z_1$, $Z_2$ and $Z_3$ respectively. The BTA relation is a neighbouring channel ban, meaning that no two stations may transmit their signals through the same or adjacent channels. Therefore, the minimum $Z_1$ between-channels-distance is two channels. To that distance ($Z_1$), the minimum signal power delta (i.e. required C/I ratio) of 3 dB has been assigned. The two other relations (TTC and BTC) are the common channel ban. Consequently, each of the $Z_2$ and $Z_3$ distances equals 1 channel. The signal power delta for $Z_2$ equals 9 dB, whereas for $Z_3$ the delta is 12 dB.

Figure 2:
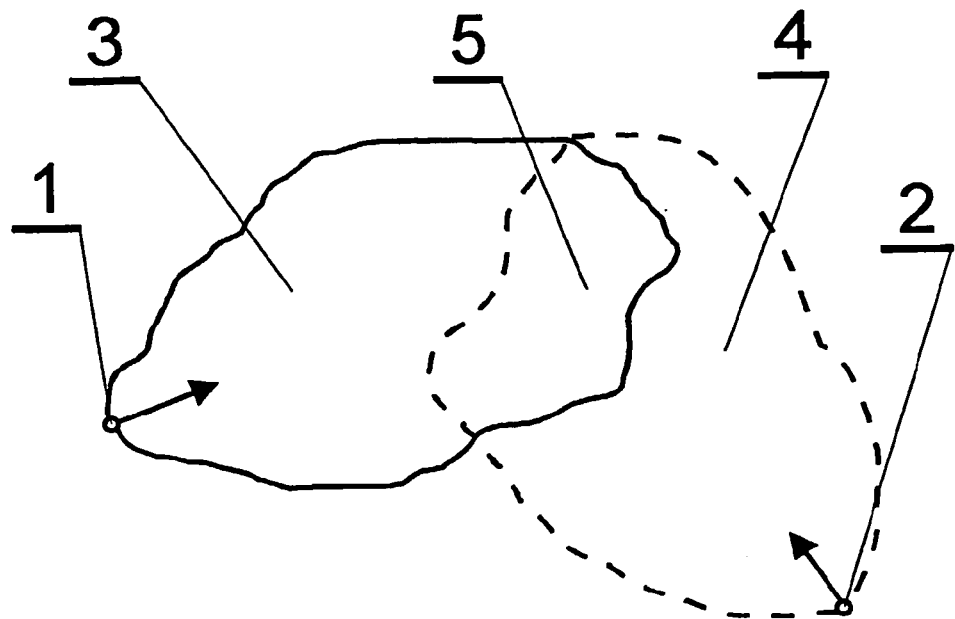
FIG. 2 presents the sample network cells with the area of the potential interference of their base stations and FIG. 3 illustrates break-down of such cells into measurement sectors.
Figure 3:
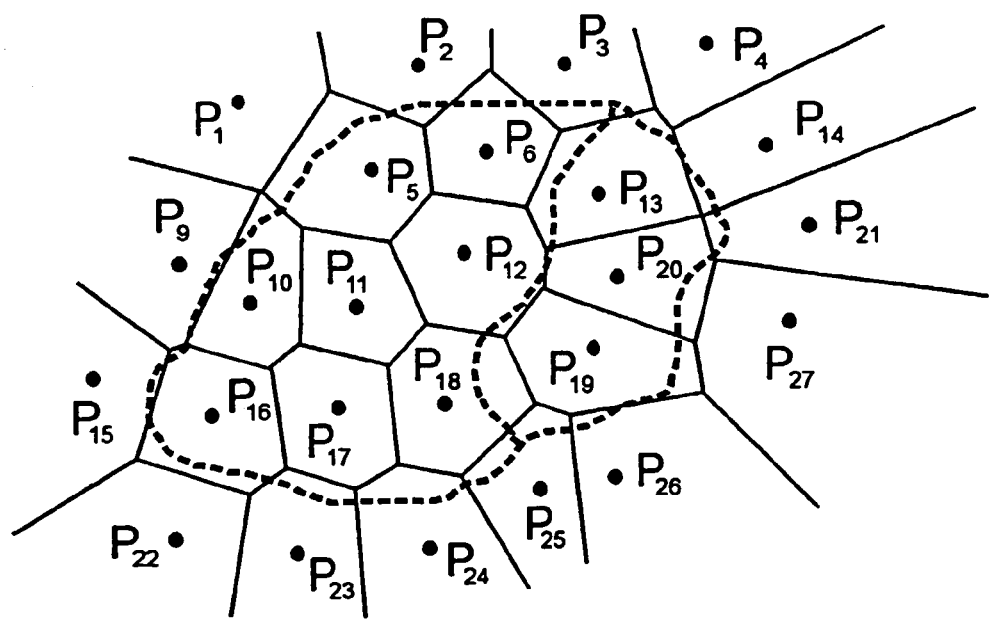

By using a vehicle with the TEMS measurement system fitted, we make a series of measurements within the area covered by pre-selected cells, along pre-defined measurement routes. The routes are defined by a planner, so as to form a regular grid, over the entire urban area under analysis, including the closer and the more remote surroundings. The TEMS system is a standard measurement tool used by mobile operators and supplied by Ericsson. Geographic co-ordinates (longitude and latitude) of the measurement point are recorded, as provided by the GPS receiver fitted in the measurement vehicle. At the same time, we registered reference numbers of the channels, which transmit the signal received by TEMS, along with the values of signal power within each such channel and IDs of the respective base stations. The $P_i$ measurement data we then entered into the Geographic Information System (GIS) and break the given section of area into $P_i$ measurement sectors, using commonly known methods of the analytic geometry. Minimum distance between a given surface point and the measurement point determines, whether or not such point is a part of the given $P_i$ measurement sector. Thus, the measurement sectors are polygonal in shape. FIG. 2 depicts two sample base stations (1,2) and their respective cells (3,4). The arrows indicate direction of wave propagation by both stations' antennae. Should the channels be wrongly selected, the stations may interfere in the joint area, marked 5. FIG. 3 presents the above described network fragment, where the $P_i$ measurements had been taken and which then have been divided into the polygonal measurement sectors. The $P_{13}$, $P_{19}$ and $P_{20}$ measurement sectors are located within the joint area 5 of the cells 3 and 4, where the interference may likely occur.

To each $P_i$ measurement we assign the $W_i$ weight, equal to the area of the polygon (sector), linked to the given measurement. Once the weights of all measurements have been set, we determine, which $S_i$ serving cell has transmitted the given signal received as part of the $P_i$ measurements, i.e. judging by the maximum signal power in the given point.

Subsequently, for each $P_i(S)$ measurement assigned to the S cell the difference is calculated between the signal power, unique for that cell and the power of each of the other signals received from other $K_i(S)$ cells, as recorded in the given point. Thereon, the $SUM_{SK}(Z_1)$ sum of $W_i(S)$ weights is computed for all types of those $P_i(S)$ measurements, for which the calculated power difference is less than 3 dB, i.e. smaller than the value of the $Z_1$ distance between channels. The same method is used for calculation of the $SUM_{SK}(Z_2)$ and $SUM_{SK}(Z_3)$ weight sums, using the signal power differences, assigned to the other two distances between channels. Then, for each of the $K_i(S)$ cells there are calculated the $q_{SK}(Z_1)$, $q_{SK}(Z_2)$ and $q_{SK}(Z_3)$ ratios of interference with a selected $S_i$ serving cell, in line with the following formula:

$$q_{SK}(Z_i) = \frac{SUM_{SK}(Z_i)}{\sum W_i(S)} \quad [1]$$

where $\Sigma W_i(S)$ represents total weight of all $P_i(S)$ measurements, assigned to that S serving cell.

Using the three calculated ratios $q_{SK}$, we calculate the value of the formula below, for each of the $K_i(S)$ under analysis.

$$(\alpha * T_T(S) + \beta T_\beta(S) + \delta * H_T(S) + \gamma * H_B(S)) * q_{SK}(Z_i) \quad [2]$$

where $\alpha$, $\beta$, $\delta$ i $\gamma$ represent non-negative ratios selected by the system operator, $T_T(S)$ represents the average daily traffic in the Si_cell, $T_B(S)$ represents the average peak traffic in the serving cell, $H_T(S)$ represents the daily average number of calls, handed over between the S and K(S) cells, and $H_B(S)$ stands for the peak average number of such handed over calls. Sample values of these ratios are: $\alpha=10$, $\beta=10$, $\delta=0.001$ and $\gamma=0.001$.

Network operators routinely gather data used for this calculation. These include average peak and daily traffic in a cell and average peak and daily call hand-over between coupled cells, i.e. calls handed over from cell 1 to cell 2 and the other way round over a pre-efined period. Average data described in this example are fed from a well known METRICA data recording system, provided for analysis of operating statistics of a mobile network. Among other purposes, the METRICA data are used for network dimensioning and service quality assessment.

Once these calculations are completed, each $K_i(S)$ cell which may cause interference is assigned a minimum distance between channels of the S serving cell. The distance equals the largest of the $Z_1$, $Z_2$ and $Z_3$ distances, for which the value of the formula [2] is lower than or equal one. Thus, we create the IOT table, having a line structure, as described in the planning software specifications. Two sample lines of an IOT table have been presented below:

| ... | | | | |
|---|---|---|---|---|
| 1 | 2 | 3.TTC | 6.BTA | |
| 6 | 3 | 1.BTA | 3.BTC | 5.BTC |
| ... | | | | |

From the first line we learn that in order to avoid unwanted interference the base station no. 1 should feature a minimum distance between its channels and channels of two other stations, namely a one-channel distance (TTC relation) from the no. 3 station and a two-channel distance (BTA relation) from the station no 6. The second line of the sample IOT table shows that 3 stations may impair signal quality of the no. 6 station, i.e. station no. 1 (a minimum 2-channel distance, BTA relation) and the stations no. 3 and 5 (in both cases the minimum distance should be 1 channel, with the BTC relation). A file with such IOT table is a source of corrective data for the PEGASOS application.

Obviously, the method according the invention above may be applied with other software provided for the frequency plan preparation, therefore we may have a different definition of the minimum Z distances between channels and apply different procedure for the gathering of data on traffic and the calls handed-over.

What is claimed is:

1. Method for determination of the minimum distances between channels of pre-selected mobile telephony network cells, characterised by comprising of the steps:

defining at least two specific $Z_i$ distances, to which a specific signal power delta value is then assigned;

taking a series of measurements ($P_i$) along a pre-defined measurement routes located within area of the cells of pre-selected base stations, and recording for each of these measurements ($P_i$):

a) reference numbers of the channels carrying the signals received, b) power of the signal within each channel and base station IDs, c) geographic co-ordinates of a point where the measurement is taken;

registering for each cell average peak traffic and average daily traffic;

registering for each pair of cells average peak- and daily number of calls handed over from cell 1 to cell 2 and vice versa;

determining for each $P_i$ measurement a sector, where a distance between any point therein and the point of the $P_i$ measurement is shorter than a distance between such point and the point of other $P_j$ measurement;

determining a $W_i$ weight of each $P_i$ measurement, equal to the area of each such sector;

assigning each $P_i$ measurement to a particular $S_i$ serving cell, selecting that with the most powerful signal as received in a given location;

calculating for each $P_i(S)$ measurement assigned to a pre-selected S serving cell a difference between the signal power from the S cell and the power of each of the other signals received from other cells, referred to as $K_i(S)$ cells;

computing for each of the defined $Z_i$ distances $SUM_{SK}(Z_i)$ sums of the $W_i(S)$ weights for all types of those $P_i(S)$ measurements, for which the calculated power difference is smaller than the signal power delta assigned to the specific $Z_i$ distance;

calculating for each of the $K_i(S)$ cells a $q_{SK}(Z_i)$ ratio of interference with a pre-selected $S_i$ serving cell, equal to the quotient of $SUM_{SK}(Z_i)$ and the total $W_i(S)$ weights for all $P_i(S)$ measurements applicable to this same $S_i$ serving cell;

calculating, for each $K_i(S)$ analysed cell, a value of the following formula:

$$(\alpha*T_T(S)+\beta T_B(S)+\delta*H_T(S)+\gamma*H_B(S))*q_{SK}(Z_i)$$

where $\alpha$, $\beta$, $\delta$ i $\gamma$ represent non-negative ratios selected by the system operator, $T_T(S)$ represents the average daily traffic in the $S_i$ cell, $T_B(S)$ represents the average peak traffic in the serving cell, $H_T(S)$ represents the daily average number of calls, handed over between the S and K(S) cells, and $H_B(S)$ stands for the peak average number of such handed over calls; and assigning for each $K_i(S)$ cell a minimum distance between a channel in such $K_i(S)$ and a channel in the pre-selected S serving cell, equal to the largest $Z_i$ distance for which the value of the above formula is smaller than, or equals one.

* * * * *